June 3, 1969   A. G. WILLISON   3,447,830
EXPANDABLE CAMPER CANOPY FOR PICKUP TRUCKS
Filed Jan. 13, 1967
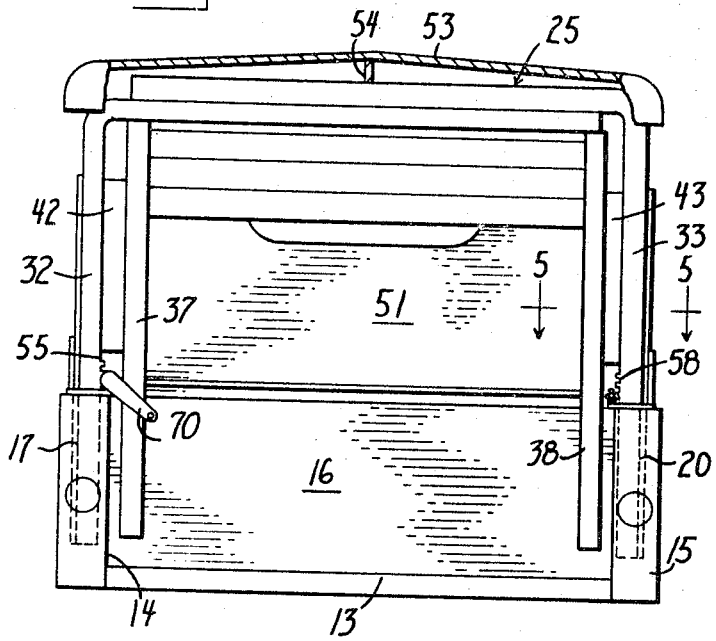
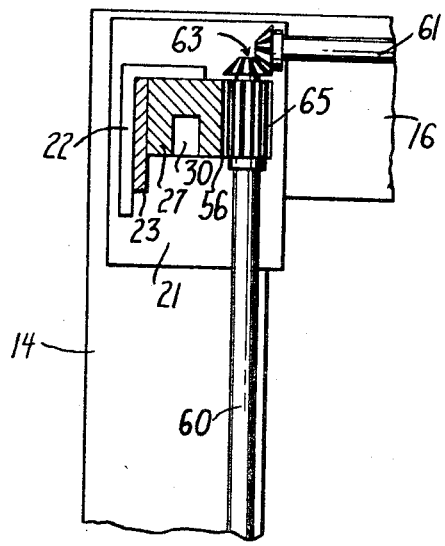
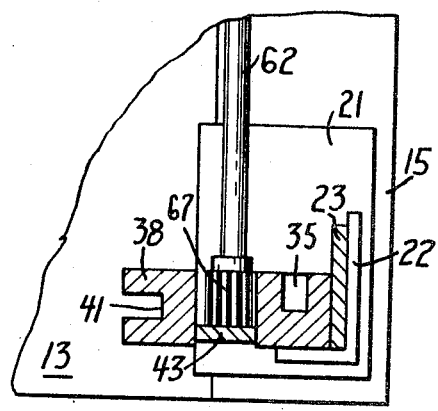
INVENTOR.
ALFRED G. WILLISON
BY
ATTYS.

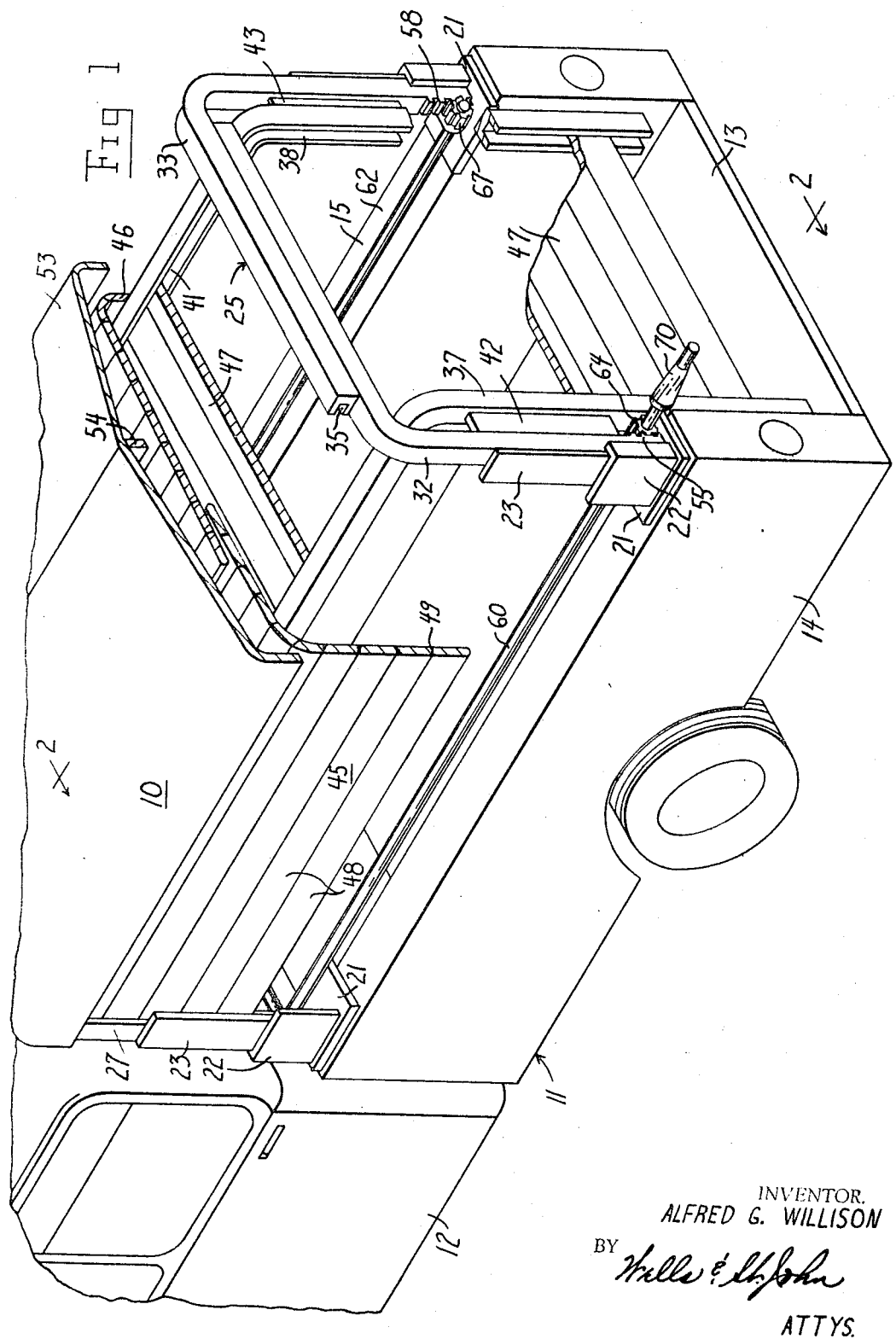

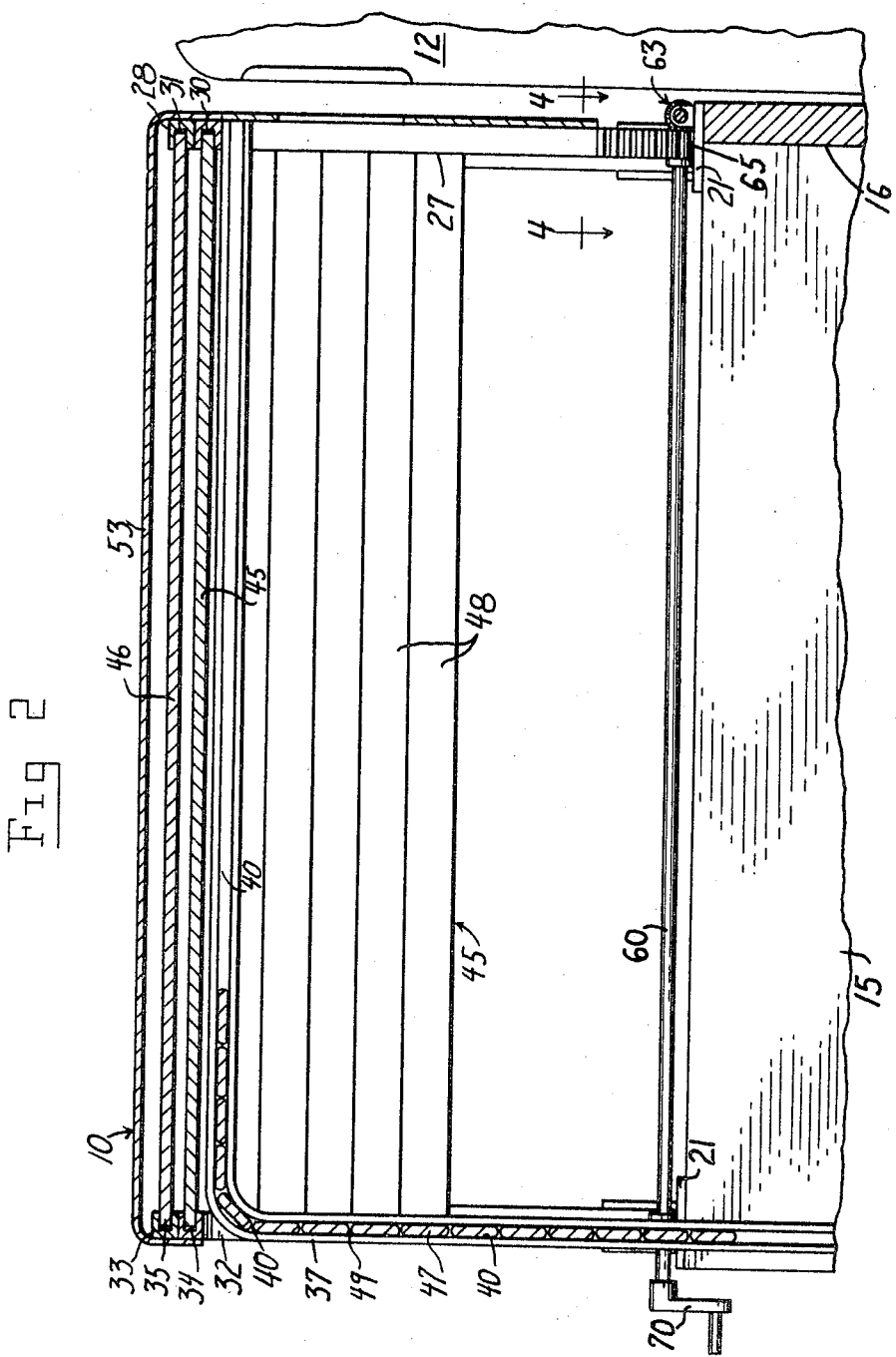

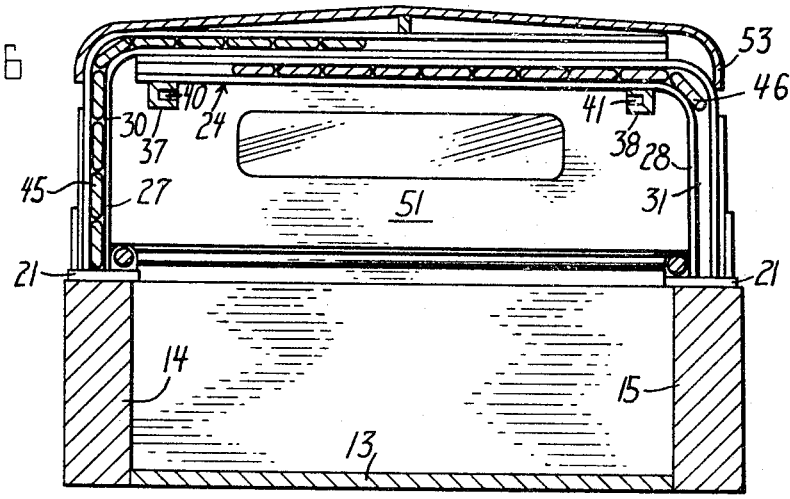
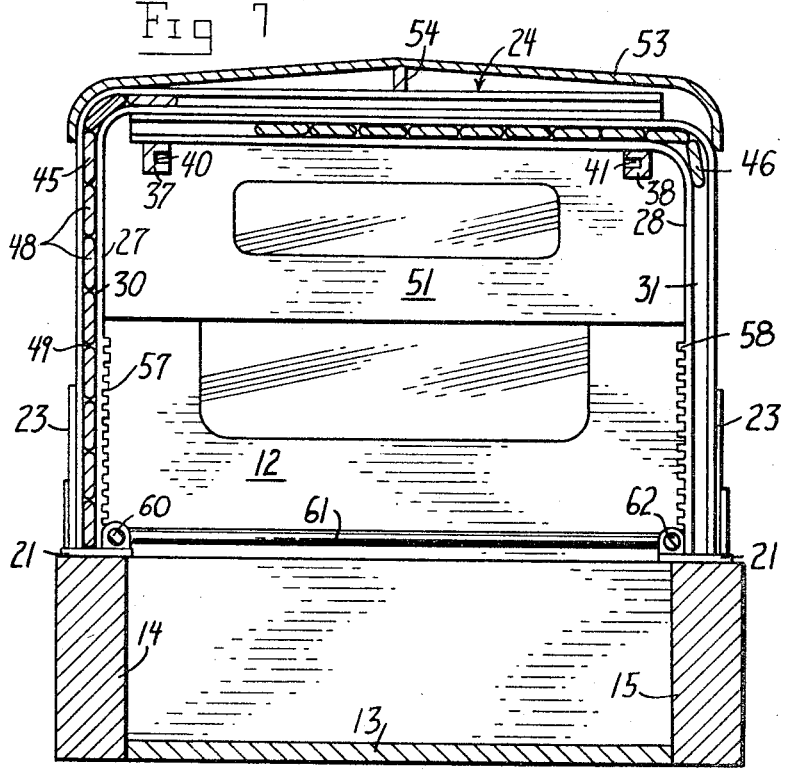

United States Patent Office 3,447,830
Patented June 3, 1969

3,447,830
EXPANDABLE CAMPER CANOPY FOR
PICKUP TRUCKS
Alfred G. Willison, 2439 McDonald Ave.,
Missoula, Mont. 59801
Filed Jan. 13, 1967, Ser. No. 609,021
Int. Cl. B60p 3/28, 7/02
U.S. Cl. 296—26          8 Claims

ABSTRACT OF THE DISCLOSURE

The disclosure of the specification describes a preferred embodiment of my invention concerning an expandable camper canopy for pickup trucks comprising a front inverted U-shaped cross frame 24 and a rear inverted U-shaped cross frame 25 slidably mounted to the truck body. Longitudinal channel iron frames 37 and 38 are interconnected to the cross frames 24 and 25 to form a unitary support structure. A pair of flexible side panels 45 and 46 are slidably mounted to the cross members for movement to and from side walls 14 and 15 of the truck body. A rear flexible panel 47 is slidably mounted to the longitudinal channel iron frames 37 and 38 for movement to and from the bed 13 of the truck body. Racks 55, 56, 57 and 58 are mounted on the legs of the cross frames 24 and 25 and are engaged by pinions 64, 65, 66 and 67 respectively. The pinions are mounted on shafts 60 and 62.

BODY OF THE SPECIFICATION

My invention relates to expandable camper canopies for pickup trucks. It is desirable to have a camper canopy that does not appreciably increase the air resistance or instability of a moving pickup truck. It is further desirable to have a camper that is capable of being expanded so that the user can stand upright within the camper. It is convenient to have an expandable canopy with means of ingress and egress in the side and rear that are independent of the position of the canopy. To have a camper with all of these advantages, it has in the past meant that there was a sacrifice in the effective usable space in the camper and that the camper was expensive and out of the financial reach of the average camper user.

One of the principal objects of my invention is to provide an expandable camper that does not substantially sacrifice the effective usable space within the camper.

An additional object of my invention is to provide an expandable camper that is efficient to operate, simple in construction and economical to manufacture.

A further object of my invention is to provide an expandable camper canopy in which the side and rear panels may be opened independently of the position of the canopy.

Other objects and advantages of my invention will become apparent by reference to the following detailed description in the accompanying drawings illustrating a preferred embodiment thereof in which:

FIG. 1 is a perspective view of an expandable canopy positioned on a vehicle showing a cut-away of the principal features of an embodiment of my invention;

FIG. 2 is a cross sectional view of the camper canopy taken along line 2—2 of FIG. 1 showing the longitudinal relationship of many of the principal features of the embodiment;

FIG. 3 is a rear view of the camper canopy showing further detail of the embodiment;

FIG. 4 is a fragmentary sectional detail view taken along line 4—4 of FIG. 2 showing connections between rotatable shafts for raising and lowering the canopy;

FIG. 5 is a fragmentary sectional detail view taken along line 5—5 of FIG. 3, showing a pinion mounted on a shaft engaging a rack;

FIG. 6 is a vertical cross sectional view of the camper canopy showing the canopy in a retracted position; and FIG. 7 is a vertical cross sectional view of the camper showing the canopy in an extended or expanded position.

Referring now in detail to the drawings, there is illustrated in FIG. 1 a camper canopy 10 positioned on a vehicle such as a pickup truck 11 having a cab 12, a bed 13, side walls 14 and 15 and front wall 16. Many of the presently available pickup trucks have side walls that have vertical stake apertures or holes 17, 18, 19 and 20 near the corners of the truck bed.

Base plates 21 are positioned on the side walls of the truck having apertures therein corresponding with the stake apertures 17, 18, 19 and 20. L-shaped side plates 22 are positioned on the base plates 21 for further assisting in the support of the canopy structure. Vertical bearing plates 23 are mounted on the L-shaped side plates 22.

The canopy comprises a front inverted U-shaped cross frame 24 and a rear inverted U-shaped cross frame 25 that are slidably mounted on the vertical bearing plates with their legs extending into the stake apertures 17, 18, 19 and 20. The front U-shaped cross frame 24 is formed by two overlapping and connected L-shaped channel irons 27 and 28 having channels 30 and 31 formed therein facing rearwardly. The rear cross frame 25 comprises two overlapping and connected L-shaped channel irons 32 and 33 having channels 34 and 35 formed therein facing forward.

Longitudinal L-shaped channel iron frames 37 and 38 extend parallel to the longitudinal axis of the truck. Frames 37 and 38 have facing channels 40 and 41 formed therein. Longitudinal channel iron 37 is rigidly supported to the rear cross frame 25 by a brace 42. Longitudinal frame 38 is rigidly mounted to the rear cross frame 25 by brace 43. The forward ends of the longitudinal frames 37 and 38 are attached to channel iron 27. Thus the cross frames 24 and 25 and the longitudinal frames 37 and 38 are interconnected to form a unitary canopy supporting structure.

A flexible side panel 45 is slidably mounted between the cross frames 24 and 25 to channel irons 27 and 32 in channels 30 and 34 for movement to and from side wall 14 of the pickup truck. A flexible side panel 46 is slidably mounted between the cross frames 24 and 25 to L-shaped channel irons 28 and 33 in channels 31 and 35 for movement to and from said wall 15 of the truck 11. A flexible rear panel 47 is slidably mounted between the longitudinal frames 37 and 38 in channels 40 and 41 for movement to and from the truck bed 13.

The flexible panels 45, 46 and 47 may be made of any suitable flexible material, such as wood, plastic or metal. In this embodiment I have shown tambour type flexible panels that are made with horizontal slots 48—48 pivotally connected to adjacent slats by hinge material 49.

To enclose the camper, a front panel 51 made of sheet material is attached to the front frame 24 and a cover 53 made of wood, plastic or metal is positioned overlying the cross frames 24 and 25 and the longitudinal frames 37 and 38 with its edges extending downwardly. The cover is supported by a brace 54 mounted to the front and rear cross frames 24 and 25.

Racks 55, 56, 57 and 58 are mounted to the legs of the cross frames 24 and 25 and are associated with the stake apertures 17, 18, 19 and 20 respectively. Shafts 60, 61 and 62 are rotatably mounted on the base plates 20 adjacent tthe racks 55, 56, 57 and 58 and are interconnected through bevel gears 63, as shown in FIGURE 4. Pinions 64 and 65 are mounted on shaft 60 in engagement with racks 55 and 56 respectively. Pinions 66 and 67 are mounted on shaft 62 in engagement with racks 57 and 58 respectively. A crank handle 70 is attached to the rearward end of shaft 60 for rotating shaft 60, 61 and 62.

In operation the side panels 45 and 46 and the rear panel 47 can be raised or lowered independently of the canopy position for ingress or egress. In FIG. 6 the canopy is in the retracted or lowered position and side panel 45 is shown rolled down enclosing the left side of the camper. It is noted that a substantial portion of the panel 45 extends horizontally immediately under cover 53. Flexible side panel 46 is shown rolled up to open the right side of the camper.

Generally the canopy is maintained in the retracted position while the vehicle is moving in order to streamline the projected contour of the vehicle to reduce the air drag and thereby increase the vehicle fuel economy. With the canopy in the retracted position the vehicle has a lower center of gravity, thus increasing the stability of the vehicle which is particularly important in cross winds.

When the user reaches his destination and desires to use the camper, he raises the canopy to its expanded or elevated position enabling him to stand within the camper without stooping. To raise the canopy the user rotates the crank 70 to simultaneously rotate shafts 60, 61 and 62 and pinions 64, 65 and 67 to move engaged racks 55, 56, 57 and 58 upwardly to raise the cross frames 24 and 25, the longitudinal frames 37 and 38 and the cover 53. When the canopy is in the elevated position the side and rear panels 45, 46 and 47 may be independently raised or lowered as desired. As shown in FIGURE 7, side panel 45 is rolled down having a very small section extending horizontally immediately under the cover 53. Side panel 46 is shown rolled up extending horizontally under the cover 53.

It is understood that the above described embodiment is simply illustrative of the application of the principles of my invention. Numerous other arrangements may be readily devised by those skilled in the art which will embody the principles of the invention and fall within the spirit and scope thereof.

What I claim is:

1. An expandable camper canopy mounted on a pickup truck comprising:
    (a) a pair of slidable side panels;
    (b) a pair of spaced inverted U-shaped cross frames slidably mounted for vertical movement on the pickup truck having channels formed therein for supporting and guiding the side panels therein;
    (c) a slidable rear panel;
    (d) a pair of spaced inverted L-shaped longitudinal frames interconnected with the U-shaped cross frames for vertical movement therewith having channels formed therein for supporting and guiding the rear panel therein;
    (e) drive means mounted on the pickup truck and operatively connected to the U-shaped cross frames for elevating the frames to expand the camper canopy.

2. The combination in accordance with claim 1 wherein the legs of the inverted U-shaped cross frames have racks mounted thereon and the drive means comprises rotatable interconnecting shafts positioned adjacent the racks, pinions mounted on the shafts in engagement with the racks, and means for rotating the shafts to move the U-shaped cross frames upwardly and downwardly.

3. The combination in accordance with claim 1 wherein the slidable side panels are formed by a plurality of adjacent parallel slats that are pivotally connected.

4. The combination in accordance with claim 3 wherein the rear panel is formed by adjacent parallel slats that are pivotally connected.

5. The combination in accordance with claim 1 wherein each of the inverted U-shaped cross frames are formed by two overlapped and connected L-shaped channel irons having channels formed therein for supporting and guiding the slidable side panels within the channel irons from a substantially vertical position to a substantially horizontal position.

6. The combination in accordance with claim 5 wherein the longitudinal frames are formed by channel irons having channels for supporting and guiding the rear panel within the channel irons from a substantially vertical position to a substantially horizontal position.

7. An expandable camper for a pickup truck body, comprising:
    (a) two spaced inverted U-shaped cross frames slidably mounted to the truck body, each cross frame having two overlapping channels formed therein facing the other cross member and having racks vertically mounted in the front stake holes;
    (b) two flexible side panels slidably mounted in the channels of the cross frames for movement there along from vertical side positions to overlapping horizontal ceiling positions;
    (c) two spaced L-shaped longitudinal frames mounted to the cross frames, each longitudinal frame having a channel formed therein facing the other longitudinal frame;
    (d) a flexible rear panel slidably mounted in the channels of the longitudinal members for movement there along from a vertical rear position to a substantially horizontal ceiling position;
    (e) a cover mounted to and overlying the cross frames;
    (f) interconnecting shafts rotatably mounted to the truck body transversely adjacent the racks;
    (g) pinions mounted to the shafts engaging the racks;
    (h) means connected to one of the shafts for rotating the shafts to raise and lower the cross frames, the longitudinal frames and the cover.

8. An expandable camper canopy for a pickup truck having a bed and side walls with stake holes formed therein near the front and rear of the bed comprising:
    (a) a first pair of L-shaped channel irons that are connectively overlapped to form an inverted U-shaped front cross frame with the channels facing toward the rear of the bed and the legs being movably mounted in the front stake holes;
    (b) a second pair of L-shaped channel irons that are connectively overlapped to form an inverted U-shaped rear cross frame with the channels facing toward the front of the bed and the legs being movably mounted in the rear stake holes;
    (c) a pair of tambour type side panels slidably mounted in the channels of the front and rear cross frames for movement to and from the truck side walls;
    (d) a pair of spaced parallel L-shaped longitudinal channel irons mounted to the cross frames;
    (e) a tambour type rear panel slidably mounted in the channels of the longitudinal channel irons for movement to and from the truck bed;
    (f) a cover mounted to and overlying the cross frames;
    (g) racks affixed to the legs of the cross frames;
    (h) interconnecting shafts rotatably mounted on the truck sides adjacent the racks;
    (i) pinions affixed to the shafts engaging the racks;
    (j) means for rotating the shafts to move the cross members, the longitudinal channels irons and the cover upwardly and downwardly to expand and contract the canopy.

References Cited

UNITED STATES PATENTS 3,140,116  7/1964  Speas ............. 296—26 X
3,053,563  9/1962  Green ............. 296—27
1,835,405  12/1931  Kaplan ............ 296—137

PHILIP GOODMAN, *Primary Examiner.*

U.S. Cl. X.R.
296—100